US008486369B2

(12) United States Patent
Garcia-Martinez et al.

(10) Patent No.: US 8,486,369 B2
(45) Date of Patent: Jul. 16, 2013

(54) INTRODUCTION OF MESOPOROSITY IN LOW SI/AL ZEOLITES

(75) Inventors: Javier Garcia-Martinez, Alicante (ES); Marvin M. Johnson, Bartlesville, OK (US); Ioulia Valla, Sturbridge, MA (US)

(73) Assignee: Rive Technology, Inc., Boston, MA (US)

(*) Notice: Subject to any disclaimer, the term of this patent is extended or adjusted under 35 U.S.C. 154(b) by 443 days.

(21) Appl. No.: 12/689,127

(22) Filed: Jan. 18, 2010

(65) Prior Publication Data

US 2010/0196263 A1 Aug. 5, 2010

Related U.S. Application Data

(60) Provisional application No. 61/145,724, filed on Jan. 19, 2009.

(51) Int. Cl.
*C01B 33/36* (2006.01)

(52) U.S. Cl.
USPC .......................................................... 423/701

(58) Field of Classification Search
USPC ................................................ 423/713, 714
See application file for complete search history.

(56) References Cited

U.S. PATENT DOCUMENTS

| | | | |
|---|---|---|---|
| 3,442,795 A * | 5/1969 | Rosinski et al. ......... 208/120.05 |
| 3,709,853 A | 1/1973 | Karapinka | |
| 3,864,280 A | 2/1975 | Schneider | |
| 4,016,218 A | 4/1977 | Haag et al. | |
| 4,088,671 A | 5/1978 | Kobylinski | |
| 4,196,182 A | 4/1980 | Willermet et al. | |
| 4,205,055 A | 5/1980 | Maire et al. | |
| 4,263,268 A | 4/1981 | Knox et al. | |
| 4,318,824 A | 3/1982 | Turner | |
| 4,439,349 A | 3/1984 | Everett et al. | |
| 4,564,207 A | 1/1986 | Russ et al. | |
| 4,609,972 A | 9/1986 | Edeling et al. | |
| 4,637,623 A | 1/1987 | Bubik | |
| 4,689,314 A | 8/1987 | Martinez et al. | |
| 4,704,375 A | 11/1987 | Martinez et al. | |
| 4,761,272 A | 8/1988 | Hucke | |
| 4,775,655 A | 10/1988 | Edwards et al. | |
| 4,806,689 A | 2/1989 | Gier et al. | |
| 4,816,135 A | 3/1989 | Martinez et al. | |
| 4,836,737 A | 6/1989 | Holmes et al. | |

(Continued)

FOREIGN PATENT DOCUMENTS

| | | |
|---|---|---|
| JP | 2004143026 | 5/2004 |
| WO | 0117901 | 3/2001 |

(Continued)

OTHER PUBLICATIONS

Sato et al, strcutural changes of y zeolites during ion exchange treatment: effects of si/al ratio of the starting NaY, 2003, microporous and mesoporous materials, pp. 133-146.*

(Continued)

*Primary Examiner* — Melvin C Mayes
*Assistant Examiner* — Stefanie Cohen
(74) *Attorney, Agent, or Firm* — Hovey Williams LLP

(57) ABSTRACT

Compositions and methods for preparing mesoporous materials from low Si/Al ratio zeolites. Such compositions can be prepared by acid wash and/or isomorphic substitution pretreatment of low Si/Al ratio zeolites prior to introduction of mesoporosity.

76 Claims, 14 Drawing Sheets

U.S. PATENT DOCUMENTS

| | | | |
|---|---|---|---|
| 4,857,494 A | 8/1989 | Martinez et al. |
| 4,891,458 A | 1/1990 | Innes et al. |
| 4,894,215 A | 1/1990 | Kawakubo et al. |
| 4,894,354 A | 1/1990 | Martinez et al. |
| 4,968,405 A | 11/1990 | Wachter |
| 5,013,699 A | 5/1991 | Vassilakis et al. |
| 5,051,385 A | 9/1991 | Wachter |
| 5,057,296 A | 10/1991 | Beck |
| 5,061,147 A | 10/1991 | Nespor |
| 5,095,169 A | 3/1992 | Skeels et al. |
| 5,102,643 A | 4/1992 | Kresge et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rosi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,391,433 A | 2/1995 | Kawakubo et al. |
| 5,393,718 A | 2/1995 | Skeels et al. |
| 5,401,384 A | 3/1995 | Martinez et al. |
| 5,458,929 A | 10/1995 | Earls et al. |
| 5,510,431 A | 4/1996 | Earls et al. |
| 5,538,710 A | 7/1996 | Guo et al. |
| 5,601,798 A * | 2/1997 | Cooper et al. ................ 423/700 |
| 5,614,453 A | 3/1997 | Occelli |
| 5,628,978 A | 5/1997 | Tejada et al. |
| 5,636,437 A | 6/1997 | Kaschmitter et al. |
| 5,659,099 A | 8/1997 | Skeels et al. |
| 5,662,965 A | 9/1997 | Deguchi et al. |
| 5,672,556 A | 9/1997 | Pinnavaia et al. |
| 5,712,402 A | 1/1998 | Pinnavaia et al. |
| 5,744,673 A | 4/1998 | Skeels et al. |
| 5,770,040 A | 6/1998 | Tejada et al. |
| 5,785,946 A | 7/1998 | Pinnavaia et al. |
| 5,786,294 A | 7/1998 | Sachtler et al. |
| 5,795,559 A | 8/1998 | Pinnavaia et al. |
| 5,800,800 A | 9/1998 | Pinnavaia et al. |
| 5,800,801 A | 9/1998 | Tejada et al. |
| 5,840,264 A | 11/1998 | Pinnavaia et al. |
| 5,840,271 A | 11/1998 | Carrazza et al. |
| 5,849,258 A | 12/1998 | Lujano et al. |
| 5,855,864 A | 1/1999 | Pinnavaia et al. |
| 5,858,457 A | 1/1999 | Brinker et al. |
| 5,892,080 A | 4/1999 | Alberti et al. |
| 5,902,564 A | 5/1999 | Lujano et al. |
| 5,952,257 A | 9/1999 | Tejada et al. |
| 5,958,367 A | 9/1999 | Ying et al. |
| 5,958,624 A | 9/1999 | Frech et al. |
| 5,961,817 A | 10/1999 | Wachter et al. |
| 5,985,356 A | 11/1999 | Schultz et al. |
| 5,993,768 A | 11/1999 | Zappelli et al. |
| 6,004,617 A | 12/1999 | Schultz et al. |
| 6,015,485 A * | 1/2000 | Shukis et al. ................ 208/112 |
| 6,022,471 A | 2/2000 | Wachter et al. |
| 6,024,899 A | 2/2000 | Peng et al. |
| 6,027,706 A | 2/2000 | Pinavaia et al. |
| 6,087,044 A | 7/2000 | Iwase et al. |
| 6,096,828 A | 8/2000 | DePorter et al. |
| 6,106,802 A | 8/2000 | Lujano et al. |
| 6,139,721 A | 10/2000 | Baldiraghi et al. |
| 6,162,414 A | 12/2000 | Pinnavaia et al. |
| 6,193,943 B1 | 2/2001 | Pinnavaia et al. |
| 6,204,424 B1 | 3/2001 | Yadav et al. |
| 6,248,691 B1 | 6/2001 | Gadkaree et al. |
| 6,297,293 B1 | 10/2001 | Bell et al. |
| 6,299,855 B1 | 10/2001 | Lujano et al. |
| 6,319,872 B1 | 11/2001 | Manzer et al. |
| 6,334,988 B1 | 1/2002 | Gallis et al. |
| 6,391,278 B1 | 5/2002 | Pinnavaia et al. |
| 6,410,473 B1 | 6/2002 | Pinnavaia et al. |
| 6,413,489 B1 | 7/2002 | Ying et al. |
| 6,413,902 B1 | 7/2002 | Pinnavaia et al. |
| 6,419,820 B1 | 7/2002 | Bogdan et al. |
| 6,476,085 B2 | 11/2002 | Manzer et al. |
| 6,476,275 B2 | 11/2002 | Schmidt et al. |
| 6,485,702 B1 | 11/2002 | Lujano et al. |
| 6,489,168 B1 | 12/2002 | Wang et al. |
| 6,495,487 B1 | 12/2002 | Bogdan |
| 6,515,845 B1 | 2/2003 | Oh et al. |
| 6,524,470 B1 | 2/2003 | Kasztelan et al. |
| 6,538,169 B1 | 3/2003 | Pittman et al. |
| 6,541,539 B1 | 4/2003 | Yang et al. |
| 6,544,923 B1 | 4/2003 | Ying et al. |
| 6,548,440 B1 | 4/2003 | Pham et al. |
| 6,558,647 B2 | 5/2003 | Lacombe et al. |
| 6,580,003 B2 | 6/2003 | Deng et al. |
| 6,583,186 B2 | 6/2003 | Moore, Jr. |
| 6,585,948 B1 | 7/2003 | Ryoo |
| 6,585,952 B1 | 7/2003 | Pinnavaia et al. |
| 6,592,764 B1 | 7/2003 | Stucky et al. |
| 6,620,402 B2 | 9/2003 | Jacobsen et al. |
| 6,623,967 B1 | 9/2003 | Willson, III |
| 6,649,413 B1 | 11/2003 | Schultz et al. |
| 6,656,443 B2 | 12/2003 | Klett |
| 6,669,924 B1 | 12/2003 | Kaliaguine et al. |
| 6,689,336 B2 | 2/2004 | Kanno |
| 6,702,993 B2 | 3/2004 | Pinnavaia et al. |
| 6,706,169 B2 | 3/2004 | Pinnavaia et al. |
| 6,706,659 B2 | 3/2004 | Gillespie et al. |
| 6,710,003 B2 | 3/2004 | Jan et al. |
| 6,746,659 B2 | 6/2004 | Pinnavaia et al. |
| 6,756,515 B2 | 6/2004 | Rende et al. |
| 6,762,143 B2 | 7/2004 | Shan et al. |
| 6,770,258 B2 | 8/2004 | Pinnavaia et al. |
| 6,793,911 B2 | 9/2004 | Koegler et al. |
| 6,797,153 B1 | 9/2004 | Fukuyama et al. |
| 6,797,155 B1 | 9/2004 | Chester et al. |
| 6,800,266 B2 | 10/2004 | Pinnavaia et al. |
| 6,809,061 B2 | 10/2004 | Bogdan et al. |
| 6,811,684 B2 | 11/2004 | Mohr et al. |
| 6,814,943 B2 | 11/2004 | Radcliffe et al. |
| 6,818,589 B1 | 11/2004 | Gillespie |
| 6,833,012 B2 | 12/2004 | Rogers |
| 6,841,143 B2 | 1/2005 | Inagaki et al. |
| 6,843,906 B1 | 1/2005 | Eng |
| 6,843,977 B2 | 1/2005 | Pinnavaia et al. |
| 6,846,546 B2 | 1/2005 | Kuroda et al. |
| 6,866,925 B1 | 3/2005 | Chane-Ching |
| 6,869,906 B2 | 3/2005 | Pinnavaia et al. |
| 6,936,234 B2 | 8/2005 | Bilenko |
| 6,998,104 B2 | 2/2006 | Tao et al. |
| 7,084,087 B2 | 8/2006 | Shan et al. |
| 7,589,041 B2 | 9/2009 | Ying et al. |
| 7,807,132 B2 | 10/2010 | Garcia-Martinez |
| 7,976,696 B2 | 7/2011 | Ying et al. |
| 8,007,663 B2 | 8/2011 | Ying et al. |
| 8,008,223 B2 | 8/2011 | Garcia-Martinez |
| 2001/0031241 A1 | 10/2001 | Lacombe et al. |
| 2001/0042440 A1 | 11/2001 | Miyazawa et al. |
| 2003/0054954 A1 | 3/2003 | Chane-Ching et al. |
| 2004/0067842 A1 | 4/2004 | Pinnavaia et al. |
| 2004/0138051 A1 | 7/2004 | Shan et al. |
| 2004/0179996 A1 | 9/2004 | Shan et al. |
| 2005/0074396 A1 | 4/2005 | Takahashi et al. |
| 2005/0130827 A1 | 6/2005 | Schunk et al. |
| 2005/0214539 A1 | 9/2005 | Ying et al. |
| 2006/0078487 A1 | 4/2006 | Endo et al. |
| 2007/0227351 A1 | 10/2007 | Garcia-Martinez et al. |
| 2007/0244347 A1* | 10/2007 | Ying et al. ................ 585/17 |
| 2008/0138274 A1 | 6/2008 | Garcia-Martinez et al. |
| 2009/0005236 A1 | 1/2009 | Ying et al. |
| 2009/0090657 A1 | 4/2009 | Ying et al. |
| 2009/0110631 A1 | 4/2009 | Garcia-Martinez |

| 2010/0190632 A1 | 7/2010 | Dight |
| 2011/0118107 A1 | 5/2011 | Garcia-Martinez |
| 2011/0171121 A1 | 7/2011 | Senderov |

FOREIGN PATENT DOCUMENTS

| WO | 0138223 | 5/2001 |
| WO | 2005102964 | 11/2005 |
| WO | 2006031259 | 3/2006 |
| WO | 2006/038912 | 4/2006 |

OTHER PUBLICATIONS

Al-Khattaf, S. et al., The Role of Diffusion in Alkyl-Benzenes Catalytic Cracking, Appl. Catal. A: Gen. 226; 139-153, (2002).

Bagri, R. et al.; Catalytic Pyrolysis of Polyethylene; Anal. Pyrolysis, 63:29-41 (2002).

Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.

Corma, A., From Microporous to Mesoporous Molecular Sieve Materials and Their Use in Catalysis, Chem. Rev., 97:2373-2419, (1997).

CSIC NM014—Method of Preparation of Mesoporous Alumina with High Thermal Stability, http://www.serina.es/escaparate/verproducto.cgi?idproducto=4980&refcompra=NULO, downloaded May 9, 2007, 2 pages.

Davis, M.E., Ordered Porous Materials for Emerging Applications, Nature, 417:813-821 (2002).

Davis, M.E., Zeolite and Molecular Sieve Synthesis, Chem. Mater., 4:756-768 (1992).

De Moor, P-P.E.A. et al., Imaging the Assembly Process of the Organic-Mediated Synthesis of a Zeolite, Chem. Eur. J., 5(7):2083-2088 (1999).

Degnan, T.F. et al., History of ZSM-5 Fluid Catalytic Cracking Additive Development at Mobile, Microporous Mesoporous Mater., 35-36:245-252 (2000).

De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).

Galo, J. de A. A. et al., Chemical Strategies to Design Textured Materials: from Microporous and Mesoporous Oxides to Nanonetworks and Hierarchical Structures, Chern. Rev., 2002, 102, 4093-4138.

Geidel, E. et al., Characterization of Mesoporous Materials by Vibrational Spectroscopic Techniques, Microporous and Mesoporous Mater., 65:31-42 (2003).

Gonzalez-Pena, V. et al., Thermally Stable Mesoporous Alumina Synthesized with Non-ionic Surfaces in teh Presence of Amines, Microporous and Mesoporous Materials, 44-45, pp. 203-210 (2001).

Goto, Y., Mesoporous Material from Zeolite, Journal of Porous Materials, 9, 2002, pp. 43-48.

Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.

Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.

Harding, R.H. et al., New Developments in FCC Catalyst Technology, Appl. Catal. A:Gen. 221:389-396 (2001).

Huang, L. et al., Investigation of Synthesizing MCM-41/ZSM Composites, J. Phys. Chem. B. 104:2817-2823 (2000).

Iijima, S., Carbon Nanotubes: Past, Present, and Future, Physica B: Condensed Matter, www.elsevier.com/locate/physb, 2002, 323, pp. 1-5.

International Search Report and Written Opinion dated Nov. 7, 2005 from International Patent Application No. PCT/US2005/05918, filed Feb. 25, 2005.

Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.

Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).

Kloestra, K.R. et al., Mesoporous Material Containing Framework Tectosilicate by Pore-Wall Recrystallization, Chem. Commun., 23:2281-2282 (1997).

Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.

Lee, H. et al., Materials Science: On the Synthesis of Zeolites, ScienceWeek, downloaded from http://www.scienceweek.com/2003/sa031031-1.htm on Apr. 23, 2005, 5 pages.

Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.

Linssen, T. et al., Mesoporous Templated Silicates: An Overview of Their Synthesis, Catalytic Activation and Evaluation of the Stability, Advances in Colloid and Interface Science, 103:121-147 (2003).

Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).

Liu, Y. et al., Aluminosilicate Mesostructures with Improved Acidity and Hydrothermal Stability, J. Mater. Chem., 12:3179-3190 (2002).

Lyons, D.M. et al., Preparation of Ordered Mesoporous Ceria with Enhanced Thermal Stability, The Journal of Materials Chemistry, vol. 12, pp. 1207-1212 (2002).

Mendes, M.F. et al., Optimization of the Process of Concentration of Vitamin E from DDSO using Supercritical CO2, Brazilian Journal of Chemical Engineering, vol. 22, No. 01, pp. 83-91, Jan.-Mar. 2005.

Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.

Ogura, M. et al., Formation of Uniform Mesopores in ZSM-5 Zeolite through Treatment in Alkaline Solution, Chemistry Letters 2000, pp. 882-883.

On, D.T. et al., Large-Pore Mesoporous Materials with Semi-Crystalline Zeolitic Frameworks, Angew. Chem. Int. Ed., 17:3248-3251 (2001).

Park, D.W. et al., Catalytic Degration of Polyethylene Over Solid Acid Catalysts, Polym. Degrad. Stabil., 65:193-198 (1999).

Patarin, J. et al., Mild Methods for Removing Organic Templates from Inorganic Host Materials, Highlights, Angew. Chem. Int. Ed. 2004, 43:3878-3880.

Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.

Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.

Scherzer, J. et al., Octane-Enhancing Zeolitic FCC Catalysts—Scientific and Technical Aspects, Marcel Dekker, Inc., 42 pages, (1990).

Storck, S. et al., Characterization of Micro- and Mesoporous Solids by Physisorption Methods and Pore-Size Analysis, Applied Catalysts A: Gen. 17:137-146 (1998).

Tao et al., Mesopore-Modified Zeolites: Preparation, Characterization, and Applications, Chem. Rev., vol. 106, pp. 896-910 (2006).

Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).

Verhoef, M. J. et al., Partial Transformation of MCM-41 Material into Zeolites: Formation of Nanosized MFI Type Crystallites, Chemical Materials, 2001, vol. 13, pp. 683-687.

Yang, P. et al., Generalized Syntheses of Large-Pore Mesoporous Metal Oxides with Semicrystalline Frameworks, Nature, vol. 396, Nov. 12, 1998, pp. 152-155; www.nature.com.

Ying, J. Y. et al., Synthesis and Applications of Supramolecular-Templated Mesoporous Materials, Angew. Chem. Int. Ed., 38:56-77 (1999).

Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.

U.S. Appl. No. 12/684,405, filed Jan. 8, 2010 entitled Compositions and Methods for Improving the Hydrothermal Stability of Mesostructured Zeolites by Rare Earth Ion Exchange; Inventors: Javier Garcia-Martinez, Marvin M. Johnson, and Ioulia Valla; Assignee: Rive Technologies, Inc.

Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.

Xia, Yongde et al., On the synthesis and characterization of ZSM-5/MCM-48 aluminosilicate composite materials, Journal of the Royal Society of Chemistry, 2004, pp. 863-870.

Guo et al., Characterization of Beta/MCM-41 Composite Molecular Sieve Compared with the Mechanical Mixture Microporous and Mesoporous Materials, vols. 44-45; pp. 427-434.

Tao et al., ZSM-5 Monolith of Uniform Mesoporous Channels, Material Sciences, Chiba University, J. Am. Chem. Soc., Japan 2003, pp. 6044-6045.

* cited by examiner

INTRODUCTION OF MESOPOROSITY IN LOW SI/AL ZEOLITES

RELATED APPLICATIONS

This application claims the benefit under 35 U.S.C. Section 119(e) of U.S. Provisional Patent Application Ser. No. 61/145,724 entitled Introduction of Mesoporosity in Low Si/Al USY Zeolite and the Effect of Drying Conditions on Mesoporosity Introduction filed Jan. 19, 2009, the entire disclosure of which is incorporated herein by reference.

BACKGROUND

1. Field

One or more embodiments of the invention relate to compositions and methods for preparing mesoporous materials from low Si/Al zeolites.

2. Description of Related Art

Previously, methods have been described to introduce mesoporosity into zeolites, for example, in U.S. Patent Application Publication No. 2007/0244347. These zeolites have a high silicon-to-aluminum ratio ("Si/Al") and low extra-framework content, namely, ultrastable zeolite Y ("USY") CBV 720 provided by Zeolyst International.

As previously described, this zeolite can be treated in the presence of a pore forming agent (for example, a surfactant) at a controlled pH under a set of certain time and temperature conditions to introduce mesoporosity into the zeolite. Thereafter, the mesostructured material can be treated to remove the pore forming agent (for example by calcination or chemical extraction).

Zeolites used in fluid catalytic cracking ("FCC") can have larger unit cell sizes than that of CBV 720 (see Table 1). For example, USY zeolite CBV 500, also from Zeolyst, may be a more suitable raw material for FCC applications. Additionally, $NH_4Y$ CBV 300, also from Zeolyst, may be suitable for such uses. As shown in Table 1, USY CBV 500 and $NH_4Y$ CBV 300 both have larger unit cell sizes, namely 24.53 Å and 24.70 Å, respectively, than USY CBV 720, namely 24.28 Å.

The CBV 500 zeolite contains a significant amount of extra-framework alumina ("EFAL"), due to the leach of some framework alumina ("FA"), as revealed by a decrease in the unit cell size from parent NaY (see Table 1). USY CBV 720, a more stabilized zeolite Y, has a much smaller unit cell size, and a reduced EFAL content, due to an acid wash following a severe stabilization treatment (e.g., steaming). CBV 300 zeolite has a low EFAL content, presumably because it is not subjected to heat treatment.

An EFAL content is the percent total of aluminum that has low extra-framework alumina. From 0-10% can be considered to be a low EFAL content whereas an EFAL content from 25-100% can be considered to be a high EFAL content.

TABLE 1

Physicochemical Characteristics of Zeolites Provided by Zeolyst Int'l

| | NaY CBV 100 | $NH_4Y$ CBV 300 | USY CBV 500 | USY CBV 720 |
|---|---|---|---|---|
| Unit Cell (Å) | 24.65 | 24.70 | 24.53 | 24.28 |
| EFAL content | Low | Low | High | Low |
| Si/Al ratio (total) | 2.6 | 2.6 | 5.2 | 30 |
| Cation | Sodium | Ammonium | Ammonium | Proton |

When the treatment described in previous patent applications to introduce mesoporosity in CBV 720 was used to introduce mesoporosity in CBV 500, no appreciable amount of mesoporosity was observed. In addition, no major change in the physicochemical characteristic of CBV 500 was observed. Similar absences of change were observed for CBV 300 and CBV 100 when subjected to the same treatments.

SUMMARY

One embodiment of the present invention concerns a method of forming a material comprising at least one mesostructured zeolite. The method of this embodiment comprises the steps of: (a) acid washing an initial zeolite with an acid thereby forming an acid-washed zeolite, where the initial zeolite has a total silicon-to-aluminum ratio (Si/Al) of less than 30; and (b) forming at least one mesopore within the acid-washed zeolite thereby forming the mesostructured zeolite.

Another embodiment of the present invention concerns a method of forming a material comprising at least one mesostructured zeolite. The method of this embodiment comprises the steps of: (a) acid washing an initial zeolite with an acid thereby forming an acid-washed zeolite, where the initial zeolite has an average unit cell size of at least 24.40 Å; and (b) forming at least one mesopore within the acid-washed zeolite thereby forming the mesostructured zeolite.

Still another embodiment of the present invention concerns a method of forming a material comprising at least one mesostructured zeolite. The method of this embodiment comprises the steps of: (a) providing an initial zeolite; (b) isomorphically substituting at least a portion of the framework aluminum in the initial zeolite with framework silicon to thereby form an isomorphically-substituted zeolite; and (c) forming at least one mesopore within the isomorphically-substituted zeolite thereby forming the mesostructured zeolite.

Yet another embodiment of the present invention concerns a method of forming a material comprising at least one mesostructured zeolite. The method of this embodiment comprises the steps of: (a) acid-washing an initial zeolite having a low silicon-to-aluminum ratio with an acid thereby forming an acid-washed zeolite; and (b) forming at least one mesopore within the acid-washed zeolite thereby forming the mesostructured zeolite.

BRIEF DESCRIPTION OF THE DRAWING FIGURES

Embodiments of the present invention are described herein with reference to the following drawing figures, wherein.

DETAILED DESCRIPTION

Figure 1:
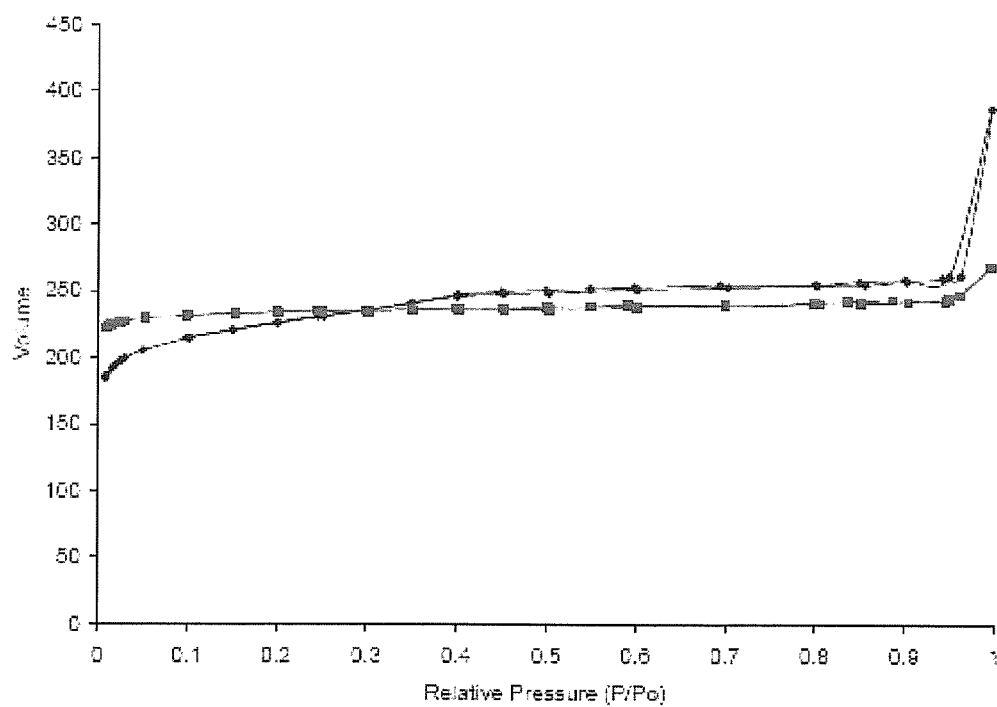
FIG. 1 is a graph depicting nitrogen physisorption isotherms at 77K of zeolite before (square data points) and after (diamond data points) having been treated with ammonium hexafluorosilicate.

Various embodiments of the present invention concern methods for preparing a material containing a mesostructured zeolite. In one or more embodiments, the mesostructured zeolite can be prepared by first subjecting an initial zeolite to an acid wash and thereafter forming at least one mesopore in the resulting acid-washed zeolite. In various other embodiments, the initial zeolite can be subjected to isomorphic substitution so as to replace at least a portion of the initial zeolite's framework aluminum atoms with framework silicon atoms. Thereafter, the isomorphically-substituted zeolite can be subjected to one or more processes for forming at least one mesopore in the zeolite.

As just mentioned, an initial zeolite can be employed as a starting material in preparing a mesostructured zeolite. In one or more embodiments, the initial zeolite can be a non-mesostructured zeolite. In other various embodiments, the initial zeolite can be a non-mesoporous zeolite. As used herein, the term "non-mesoporous" shall denote a composition having a total volume of less than 0.05 cc/g of 20 to 80 Å diameter mesopores. In one or more embodiments, initial zeolite starting materials can have a total 20 to 80 Å diameter mesopore volume of less than 0.01 cc/g. Additionally, suitable initial zeolites can have a total 1 to 20 Å micropore volume of at least 0.3 cc/g. Furthermore, the initial zeolite can have an average unit cell size of at least 24.40, at least 24.45, or at least 24.50 Å.

In various embodiments, the initial zeolite can have a low silicon-to-aluminum ratio ("Si/Al"). For example, the initial zeolite can have an Si/Al ratio of less than 30, less than 25, less than 20, less than 15, or less than 10, taking into consideration the total amount of aluminum in the zeolite (i.e., both framework and extra-framework aluminum). Additionally, the initial zeolite can have an Si/Al ratio in the range of from about 1 to about 30, in the range of from about 2 to about 20, or in the range of from 3 to 10. Furthermore, in various embodiments, the initial zeolite can have a high EFAL content. In one or more embodiments, the initial zeolite can have an EFAL content of at least 25, at least 30, at least 35, or at least 40 percent.

The type of zeolite suitable for use as the initial zeolite is not particularly limited. However, in one or more embodiments, the initial zeolite can be a Y zeolite (a.k.a., faujasite). Additionally, the initial zeolite can be an ultra-stable Y zeolite ("USY"). Specific examples of commercially-available Y zeolites suitable for use include, but are not limited to, USY CBV 500 and USY CBV 300, both available from Zeolyst International. Furthermore, the initial zeolite can be fully crystalline and can have long-range crystallinity.

As noted above, the initial zeolite can be pretreated with an acid wash prior to being exposed to the method of mesoporosity incorporation. Without being restricted to any specific theory, it is hypothesized that the difficulty of mesoporosity introduction in low Si/Al zeolites can be caused by i) the presence of a relatively high EFAL content that partially blocks the incorporation of mesoporosity in the zeolite, and/or ii) the higher Al content in the zeolite framework makes the local rearrangement needed to accommodate the pore forming agent in the zeolite more difficult (Si—O—Al bonds are less labile in basic pH than Si—O—Si bonds). Both properties may contribute to the more difficult introduction of mesoporosity in low Si/Al zeolites.

In one or more embodiments, the initial zeolite can be acid washed by exposing the zeolite in a solution containing an acid for a certain amount of time and temperature. The acid employed during the acid wash can be any known or hereafter discovered mineral acid, organic acid, or mixtures or two or more thereof. Furthermore, in various embodiments, the acid employed can also be a chelating agent. Additionally, one or more complexing agents (such as fluoride) can be employed during the acid wash. Specific examples of acids suitable for use in the various embodiments described herein include, but are not limited to, hydrochloric acid, hydrofluoric acid, sulfuric acid, nitric acid, acetic acid, sulfonic acid, oxalic acid, citric acid, ethylenediaminetetraacetic acid ("EDTA"), and mixtures of two or more thereof. In one or more embodiments, the acid comprises citric acid. When a chelating agent is employed, such chelating agent can also be used to treat the initial zeolite simultaneously with the below-described procedures for mesopore incorporation (e.g., the chelating agent can be included in the same reaction medium as the pH controlling medium and pore forming agent).

In one or more embodiments, a buffer solution can be employed during the acid wash that uses a weak acid in combination with a weak acid salt to give a constant pH. For example, in one embodiment citric acid can be used with ammonium citrate to produce a constant pH, but other weak acids and weak acid salts can be used.

During the acid wash, the acid can be present in an amount in the range of from about 1 to about 10, or in the range of from 1.5 to 4 milliequivalents per gram of initial zeolite. Additionally, the acid-containing solution employed for the acid wash can have a pH in the range of from about 1 to about 6. Furthermore, the acid wash can be performed at a temperature in the range of from about 20 to about 100° C. Moreover, the acid wash can be performed over a time period ranging from about 5 minutes to about 12 hours, or in the range of from 30 minutes to 2 hours. In one or more embodiments, the initial zeolite is not steamed prior to acid washing.

In one or more embodiments, following the acid wash, the acid-washed zeolite can be vacuum filtered and washed with water. After the water wash, the acid-washed zeolite can be filtered again. Any filtering and washing techniques known or hereafter discovered in the art may be employed for these steps.

Without being restricted to any particular theory, it appears that acid washing the initial zeolite opens some Si—O—Al bonds in the zeolite framework, creating Si—OH and Al—OH terminal groups on the surface of the zeolite. This seems to make the acid-washed zeolite more reactive and therefore the incorporation of mesoporosity easier. Accordingly, in one or more embodiments, the acid-washed zeolite can have fewer Si—O—Al bonds in its zeolite framework than the above-described initial zeolite. In various embodiments, the acid-washed zeolite can have at least 0.1, at least 1, at least 5, or at least 10 percent fewer Si—O—Al bonds than the initial zeolite. Furthermore, the acid-washed zeolite can have a greater number of Si—OH and/or Al—OH terminal groups than the initial zeolite. In various embodiments, the acid-washed zeolite can have at least 0.1, at least 1, at least 5, or at least 10 percent more Si—OH and/or Al—OH terminal groups than the initial zeolite.

Furthermore, the resulting acid-washed zeolite can have a decreased aluminum content. However, in one or more embodiments, the aluminum content of the acid-washed zeolite can be maintained in an amount sufficient to preserve the unit cell size of the acid-washed zeolite at a minimum of at least 24.30, 24.35, or 24.40 Å.

In addition or in the alternative to the above-described acid wash procedure, the initial zeolite can subjected to a procedure for isomorphically substituting at least a portion of the initial zeolite's framework aluminum with framework silicon. In one or more embodiments, such substitution can be accomplished by chemical treatment with an isomorphic substitution agent, such as, for example, ammonium hexafluorosilicate or silicon tetrachloride. In various embodiments, the isomorphic substitution agent can be in liquid form and/or vapor form during treatment. This treatment is effective to increase the Si/Al ratio without causing significant EFAL, thus allowing greater mesopore formation in the resulting isomorphically-substituted zeolite. As evidence of this, FIG. 1 depicts nitrogen physisorption isotherms at 77K of zeolite before (square data points) and after (diamond data points) having been treated with ammonium hexafluorosilicate. FIG. 1 indicates an increase in mesopore volume of the isomorphically-substituted zeolite beginning at approximately 0.3 relative pressure. In one or more embodiments, the isomorphic substitution of the initial zeolite can cause an increase in the Si/Al ratio of at least 1, at least 5, at least 10, at least 20, at least 50, or at least 100 percent.

Various embodiments of the present technology can also include an additional step of controlled drying of the acid-washed zeolite prior to the below-described mesopore incorporation. Herein, it is shown that selective drying allows for further tuning the incorporation of controlled mesoporosity in zeolites while maintaining a desired amount of microporosity. In some embodiments, the amount of microporosity and mesoporosity in low Si/Al zeolites can be controlled during pretreatment by using different drying conditions following acid wash treatment.

As noted above, it appears that the previously-described acid washing opens some Si—O—Al bonds in the zeolite framework, creating Si—OH and Al—OH terminal groups on the surface of the zeolite. This seems to make the acid-washed zeolite more reactive and therefore the incorporation of mesoporosity easier. Though not wishing to be bound by theory, it appears that severe drying conditions (for example, 80° C. overnight, but other drying conditions can be used) manage to condense some of the hydroxyl terminal groups created during the acid treatment thereby eliminating at least some of the added reactivity of the zeolite. Increases in the severity of the drying conditions can allow for incorporating significant mesoporosity, while maintaining a high degree of microporosity in the zeolite. By increasing the severity of drying conditions, a higher amount of crystallinity and unit cell size ("UCS") can be preserved.

In one or more embodiments, the optional drying step can include drying at a temperature of at least 20, at least 50, or at least 80° C. Additionally, the drying step can be performed at a temperature in the range of from about 20 to about 150° C., in the range of from about 50 to about 120° C., or in the range of from 70 to 90° C. Furthermore the drying step can be performed for a time period of at least 5 minutes, at least 30 minutes, or at least 1 hour. In other embodiments, the drying step can be performed for a time period in the range of from about 5 minutes to about 24 hours, in the range of from about 15 minutes to about 12 hours, or in the range of from 30 minutes to 2 hours.

In still other embodiments, the drying step can be omitted entirely. In other words, after filtering the acid-washed zeolite, the resulting wet cake can be directly subjected to the below-described mesopore formation process.

As mentioned above, the pretreated (e.g., acid-washed and/or isomorphically substituted) initial zeolite can be subjected to a mesopore formation process in order to form at least one mesopore in the pretreated initial zeolite. Methods for mesopore incorporation contemplated by various embodiments of the present technology (e.g., introduction of mesoporosity in zeolites) can generally include the following steps:

1. Contacting the pretreated zeolite with a pH controlling medium in the presence of a pore forming agent under various time and temperature conditions.
2. Filter, wash, and dry the zeolite.
3. Remove and/or recover the pore forming agent, for example by calcination (removal) and/or chemical extraction (recovery).
4. The resulting material can also be chemically modified (for example by ion exchange with rare earths), blended with binders, matrix, and additives, and shaped (for example, in beads, pellets, FCC catalysts).

In one or more embodiments, the mesopore formation process can be performed employing any reagents and under any conditions described in U.S. Published Patent Application No. 2007/0244347, the entire disclosure of which is incorporated herein by reference. For example, the temperature employed during mesopore formation can range from about room temperature to about 200° C. The time period employed can be in the range of from about 2 hours to about 2 weeks. Furthermore, the pH controlling medium can have a pH in the range of from about 9 to about 11. In one or more embodiments, the pH controlling medium can comprise a base, such as, for example, ammonium hydroxide. Additionally, the pore forming agent can include a surfactant. When basic conditions are employed, typically a cationic surfactant can be used, such as a cetyltrimethyl ammonium halide (e.g., cetyltrimethyl ammonium bromide ("CTAB")).

Following the contacting step, the zeolite can be filtered, washed, and/or dried. In one or more embodiments, the zeolite can be filtered via vacuum filtration and washed with water. Thereafter, the recovered zeolite can optionally be filtered again and optionally dried.

Following the filter, wash, and drying steps, the zeolite can be subjected to heat treatment or chemical extraction in order to remove or recover at least a portion of the pore forming agent. In one or more embodiments, the zeolite can be calcined in nitrogen at a temperature in the range of from about 500 to about 600° C., and then in air for pore forming agent (e.g., surfactant) removal. The pore forming agent removal technique is selected based, for example, on the time needed to remove all of the pore forming agent from the zeolite. The total time period employed for heat treatment of the zeolite can be in the range of from about 30 minutes to about 24 hours, or in the range of from 1 to 12 hours.

The resulting mesostructured zeolite can be a one-phase hybrid single crystal having long range crystallinity. In one or more embodiments, the mesostructured zeolite can be fully crystalline, and can include mesopore surfaces defining a plurality of mesopores. A cross-sectional area of each of the plurality of mesopores can be substantially the same. In various embodiments, the mesostructured zeolite can have a total 20 to 80 Å diameter mesopore volume of at least 0.05, 0.1, 0.15, or 0.2 cc/g. Additionally, the mesostructured zeolite can have a total 20 to 80 Å diameter mesopore volume in the range of from about 0.05 to about 0.4, or in the range of from 0.1 to 0.3 cc/g.

As noted above, various techniques described herein can be employed to control or maintain the microporosity of the mesostructured zeolite. In one or more embodiments, the mesostructured zeolite can have a total 1 to 20 Å diameter micropore volume of less than 3.0, less than 2.5, less than 2.0, less than 1.5, or less than 1.0 cc/g. Additionally, the mesostructured zeolite can have a total 1 to 20 Å diameter micropore volume in the range of from about 0.001 to about 3.0, in the range of from about 0.01 to about 2.0, or in the range of from 0.05 to 1.0 cc/g.

In one or more embodiments, the mesostructured zeolite can have an average unit cell size of at least 24.30, 24.35, or 24.40 Å.

In the present technology, it is contemplated that low Si/Al USY mesostructured zeolites can also be prepared by realuminating high Si/Al mesostructured zeolites, such as those described in U.S. Patent Application Publication Number 2007/0244347 from CBV 720. Any methods known or hereafter discovered in the art for aluminating a zeolite can be employed in this embodiment.

The following examples are intended to be illustrative of the present invention in order to teach one of ordinary skill in the art to make and use the invention and are not intended to limit the scope of the invention in any way.

EXAMPLES

Example 1

No Pretreatment of CBV 720

8 g of CBV 720 were added to a clear solution containing 50 mL of deionized water, 15 mL of an $NH_4OH$ aqueous solution (30 wt %), and 4 g of cetyltrimethyl ammonium bromide ("CTAB") to form a suspension. The suspension was treated in a sealed vessel at 80° C. for 24 hrs. After this time, the solid was filtered out, washed with deionized water, dried at room temperature overnight, and heat treated. During heat treatment, the sample was heated in a nitrogen atmosphere from room temperature to 550° C. in 4 hours, the sample was held at 550° C. for 2 hours, and then dried in air for 8 hours at 550° C.

Figure 2A:
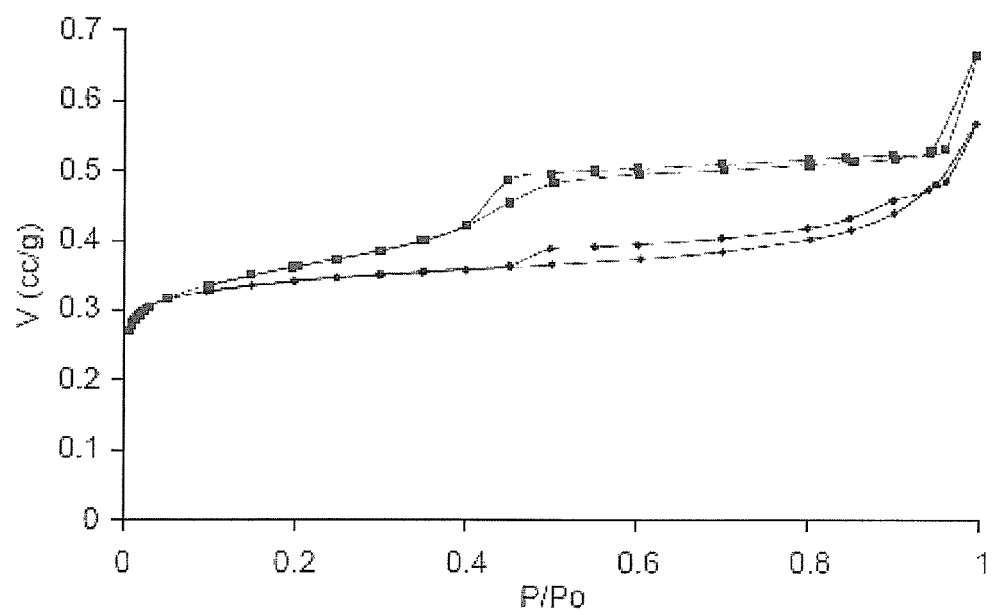
FIG. 2a is a graph depicting nitrogen physisorption isotherms at 77K of CBV 720 before (diamond data points) and after (square data points) having been treated as described in Example 1.
Figure 2B:
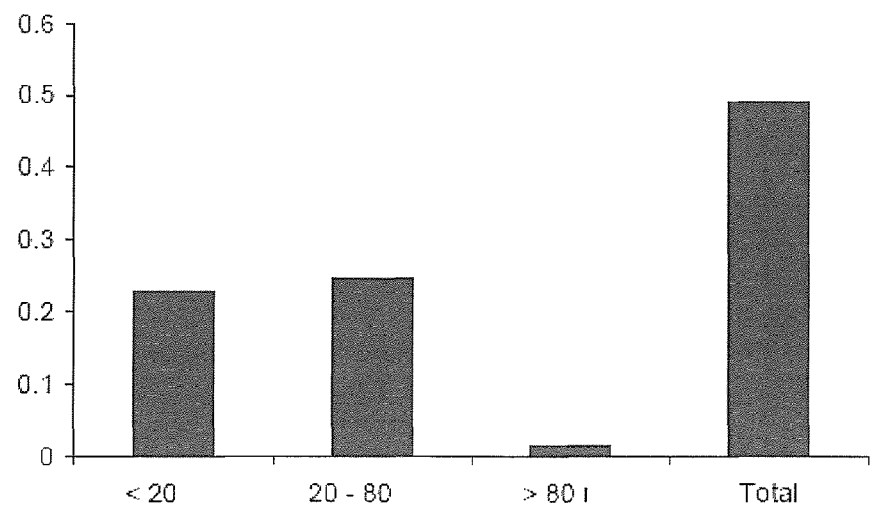
FIG. 2b is a pore size distribution plot obtained using non-linear density functional theory of the material produced in Example 1.

This treatment produced the incorporation of a significant amount of mesoporosity (over 0.2 cc/g) with a controlled pore size (2-8 nm). The sample was tested by nitrogen physisorption at 77K (FIGS. 2a and 2b).

Example 2

No Pretreatment of CBV 500

8 g of CBV 500 were added to a clear solution containing 50 mL of deionized water, 15 mL of an $NH_4OH$ aqueous solution (30 wt %), and 4 g of CTAB to form a suspension. The suspension was treated in a sealed vessel at 80° C. for 24 hrs. After this time, the solid was filtered out, washed with deionized water, dried at room temperature overnight, and heat treated. During heat treatment the sample was heated in a nitrogen atmosphere from room temperature to 550° C. in 4 hours, held at 550° C. for 2 hours, and then dried in air for 8 hours at 550° C.

Figure 3A:
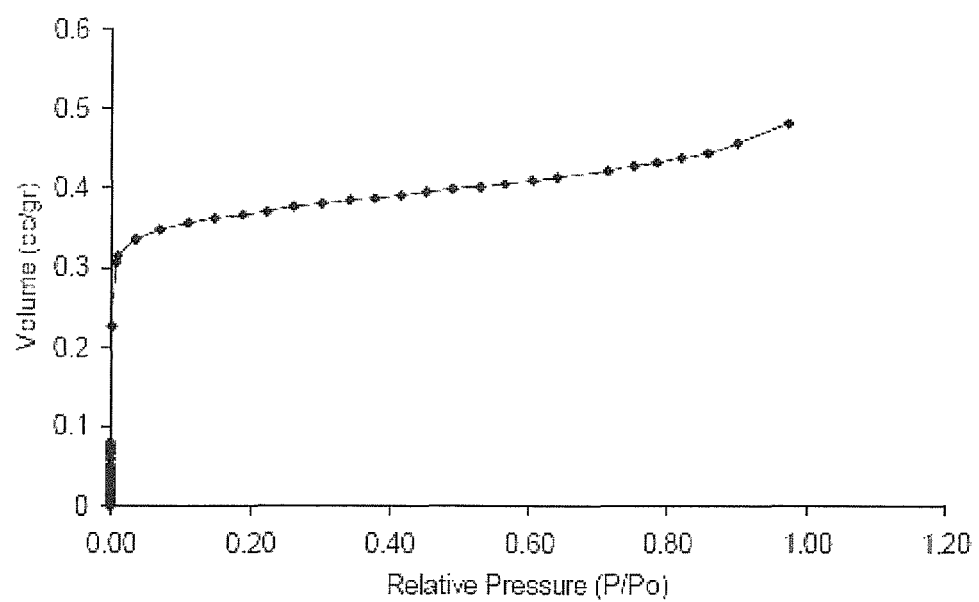
FIG. 3a is a graph depicting an argon physisorption isotherm at 87K of CBV 500 after having been treated as described in Example 2.
Figure 3B:
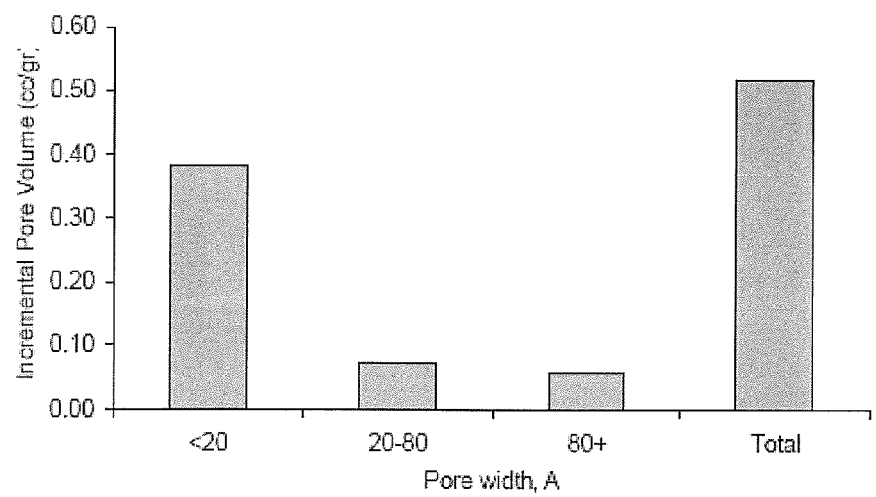
FIG. 3b is a pore size distribution plot obtained using non-linear density functional theory of the material produced in Example 2.

This treatment did not produce any significant mesoporosity in the final material, as tested by argon physisorption at 87K (FIGS. 3a and 3b).

Example 3

No Pretreatment of CBV 300

8 g of CBV 300 were added to a clear solution containing 50 mL of deionized water, 15 mL of an $NH_4OH$ aqueous solution (30 wt %), and 4 g of CTAB to form a suspension. The suspension was treated in a sealed vessel at 80° C. for 24 hrs. After this time, the solid was filtered out, washed with deionized water, dried at room temperature overnight, and heat treated. During heat treatment the sample was heated in a nitrogen atmosphere from room temperature to 550° C. in 4 hours, held at 550° C. for 2 hours, and then dried in air for 8 hours at 550° C.

This treatment did not produce any significant mesoporosity in the final material.

Example 4

Acid Wash Pretreatment of CBV 500

25 g of dried CBV 500 were added to a solution containing 750 mL deionized water containing 6.4 g of citric acid to form a suspension. The suspension was stirred for 30 min. at room temperature. The solid was vacuum filtered and washed using 750 mL $H_2O$ and the solid was filtered again. The filter cake was recovered and dried at 80° C. overnight. Then the solid was sieved and 22.90 g of solid were recovered.

22.8 g of the recovered, pre-treated CBV 500 solid were added to a clear solution containing 152 mL deionized water, 46 mL $NH_4OH$, and 9.1 g of CTAB to form a suspension. The suspension was treated in a sealed vessel at 80° C. for 24 hrs. Then, the solid was filtered out and the cake was washed with deionized water (in situ washing 3×300 mL $H_2O$). The filtered cake was removed and dried in an oven overnight at 80°

C. The sample was heated in nitrogen atmosphere at 550° C. for 2 hrs and then heated at 600° C. in air for 4 hrs.

Figure 4A:
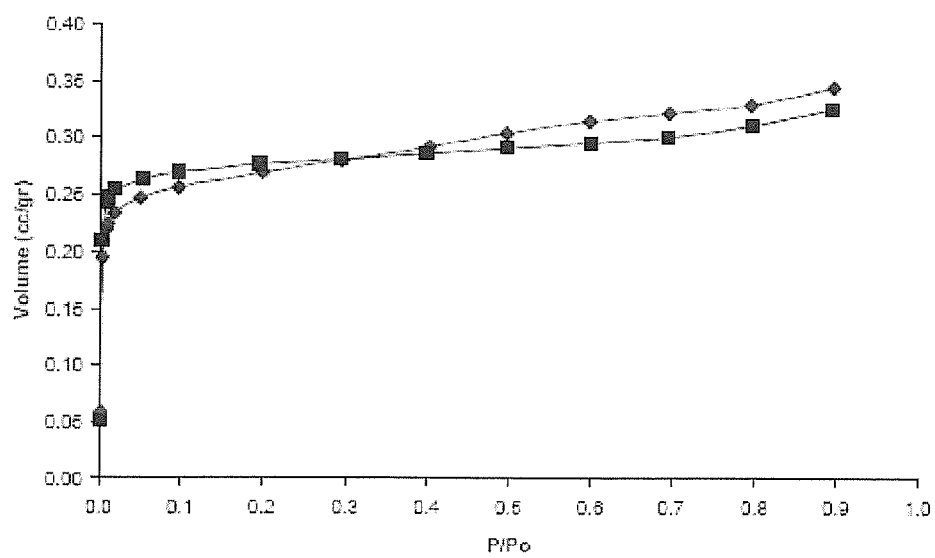
FIG. 4a is a graph depicting argon physisorption isotherms of CBV 500 before (square data points) and after (diamond data points) having been treated as described in Example 4.
Figure 4B:
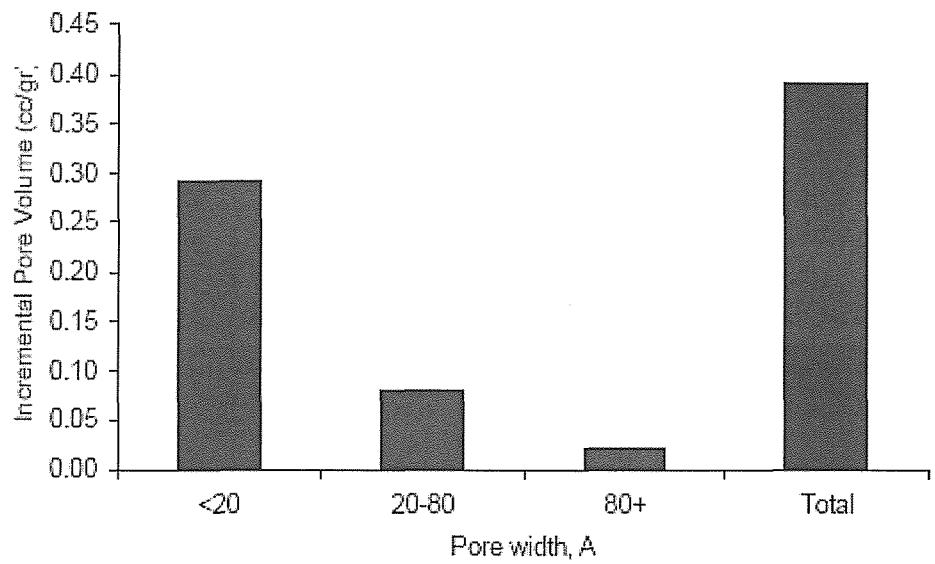
FIG. 4b is a pore size distribution plot obtained using non-linear density functional theory of the material produced in Example 4.

This treatment produced a small amount of mesoporosity, while retaining a significant amount of microporosity as tested with argon adsorption (FIGS. 4a and 4b).

Example 5

Acid Wash Pretreatment of CBV 500

A solution of 25 g citric acid and 750 mL deionized water was prepared. The solution was stirred for 10 min. A first 8.33 g of CBV 500 were added to the solution and stirred for 10 min. A second 8.33 g of CBV 500 were added to the suspension and was then stirred for an additional 10 min. A third 8.33 g of CBV 500 were added to the suspension and was then stirred for an additional 10 min. Thus, a total of 25 g of CBV 500 were stirred into the citric acid/deionized water solution. Then the total suspension was stirred for 1 hr. The suspension was transferred to a vacuum filter unit, where it was filtered and washed in situ using 750 mL $H_2O$. The recovery was dried in an oven at 80° C. overnight.

19.88 g of the above solid were added to a clear solution containing 133 mL $H_2O$, 40 mL $NH_4OH$, and 7.95 g CTAB. The suspension was treated in a sealed vessel at 80° C. for 24 hrs. After this time, the solid was filtered out and washed with deionized water in situ. The filter cake was recovered and dried in an oven overnight at 80° C. The sample was heated in nitrogen atmosphere at 550° C. for 2 hrs and then heated at 600° C. in air for 4 hrs.

Figure 5A:
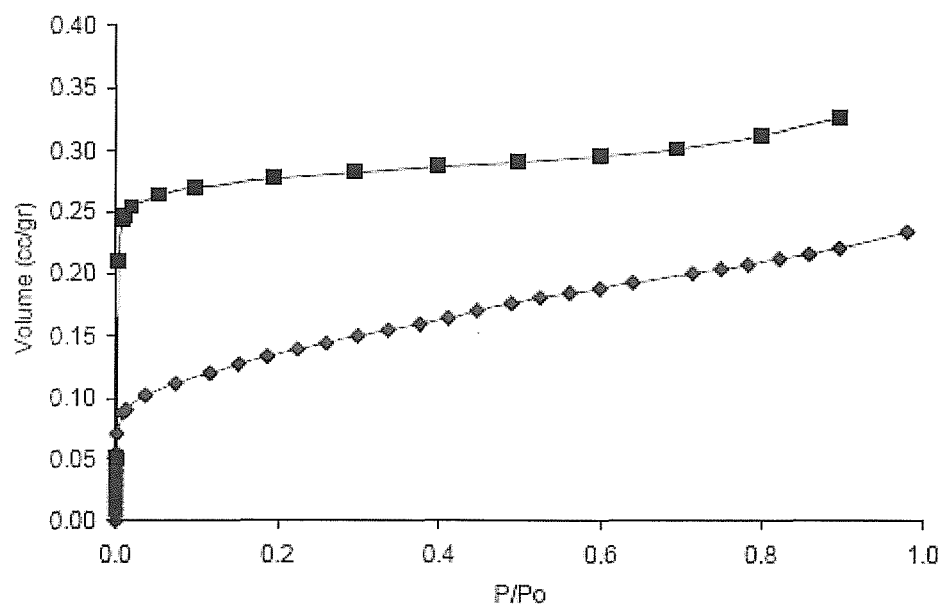
FIG. 5a is a graph depicting argon physisorption isotherms of CBV 500 before (square data points) and after (diamond data points) having been treated as described in Example 5.
Figure 5B:
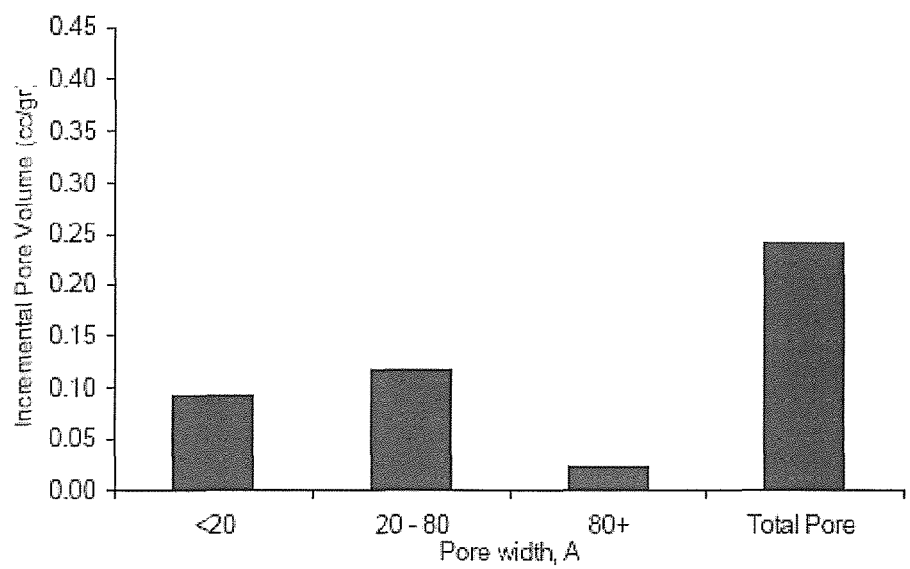
FIG. 5b is a pore size distribution plot obtained using non-linear density functional theory of the material produced in Example 5.

This treatment caused high reduction of zeolite microporosity, but did not introduce a significant amount of mesoporosity as tested by argon physisorption (FIGS. 5a and 5b).

Example 6

Acid Wash Pretreatment of CBV 500

25 g of CBV 500 zeolite were added in 375 mL $H_2O$ containing 8 g citric acid to form a suspension. The suspension was stirred for 30 min. at room temperature. The solid was vacuum filtered and then washed using 375 mL $H_2O$ and then filtered. The filter cake was recovered and dried in an oven at 80° C. for 24 hrs. Then the recovered pre-treated CBV 500 solid that was recovered from the filter cake was sieved.

21.86 g of the above solid were added to a clear solution containing 146 mL $H_2O$, 44 mL $NH_4OH$, and 8.74 g CTAB to form a suspension. The suspension was treated in a sealed vessel at 80° C. for 24 hrs. After this time the solid was filtered out and washed with deionized water. The filter cake was recovered and dried in an oven overnight at 80° C. The sample was heated in nitrogen atmosphere at 550° C. for 2 hrs and then heated at 600° C. under air for 4 hrs.

Figure 6A:
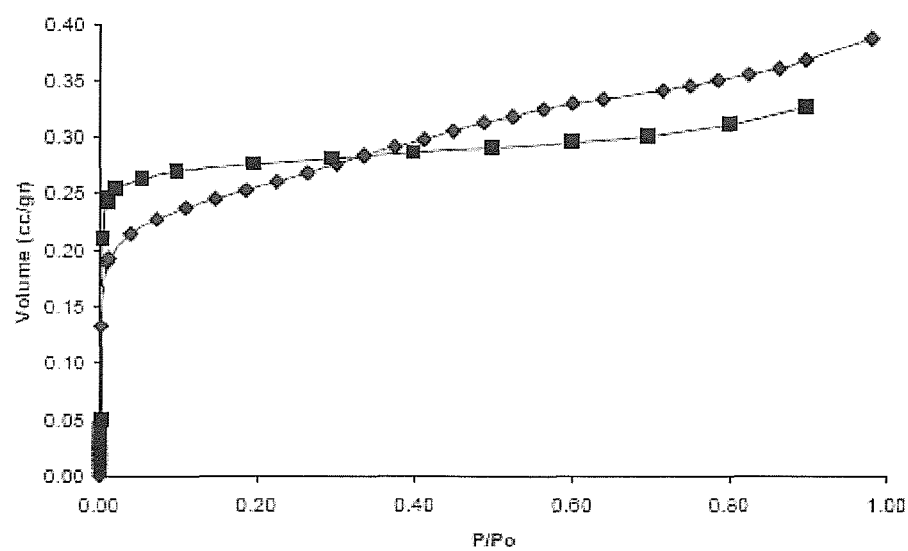
FIG. 6a is a graph depicting argon physisorption isotherms of CBV 500 before (square data points) and after (diamond data points) having been treated as described in Example 6.
Figure 6B:
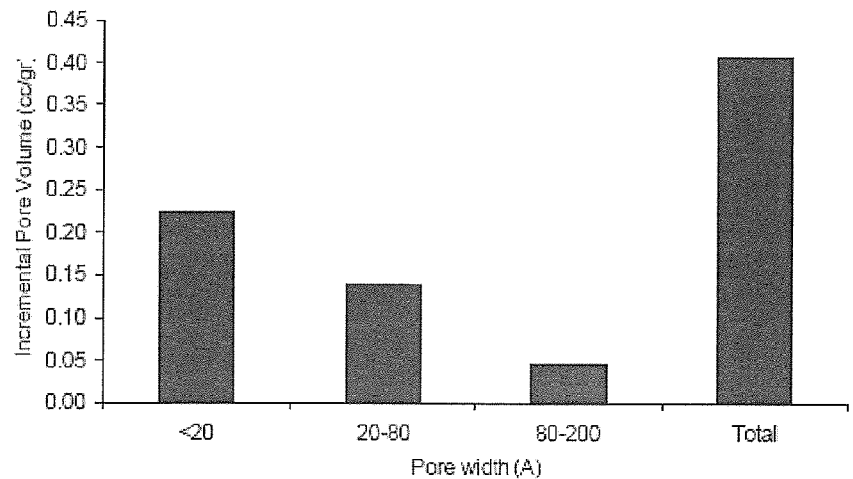
FIG. 6b is a pore size distribution plot obtained using non-linear density functional theory of the material produced in Example 6.

This treatment caused a small reduction of zeolite microporosity, while introducing a reasonable amount of mesoporosity (FIGS. 6a and 6b).

Example 7

Acid Wash Pretreatment of CBV 500 with 1 Hour Drying at 20° C.

25 g of CBV 500 zeolite were added in 375 mL $H_2$ containing 9.5 g citric acid to form a suspension. The suspension was stirred for 30 min. at room temperature. The solid was vacuum filtered and washed using 375 mL $H_2O$. The filter cake was recovered and dried under air for 1 hr. Then the recovered pre-treated CBV 500 solid recovered from the filter cake was sieved.

25 g of the wet cake were added to a clear solution containing 167 mL $H_2O$, 50 mL $NH_4OH$, and 10 g CTAB. The suspension was treated in a sealed vessel at 80° C. for 24 hrs. After this time the solid was filtered out and washed with deionized water. The filter cake was recovered and air dried overnight. The sample was heated in nitrogen atmosphere at 550° C. for 2 hrs and then heated at 600° C. under air for 4 hrs.

Figure 7A:
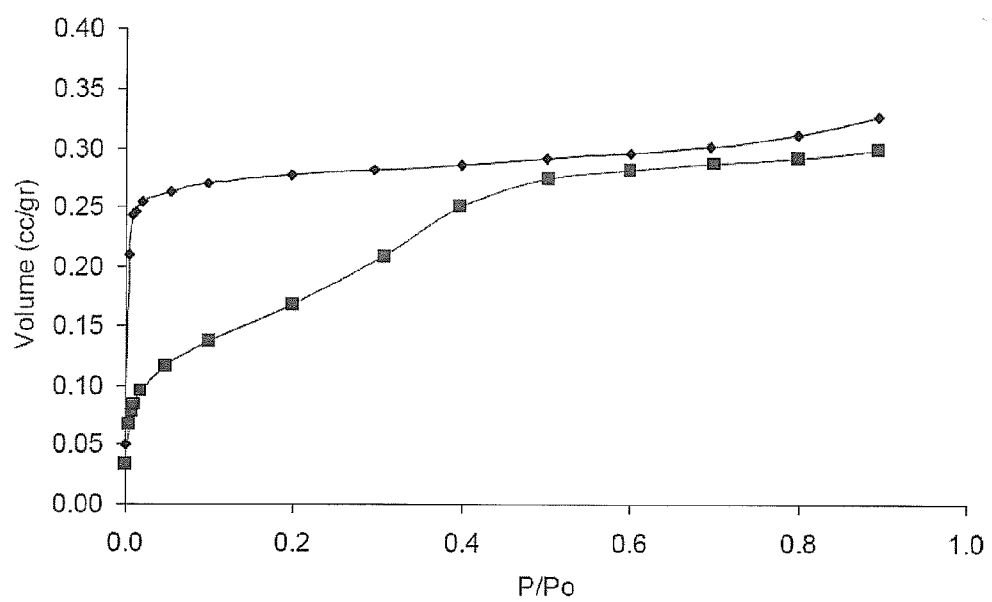
FIG. 7a is a graph depicting argon physisorption isotherms at 87K of CBV 500 before (diamond data points) and after (square data points) having been treated as described in Example 7.
Figure 7B:
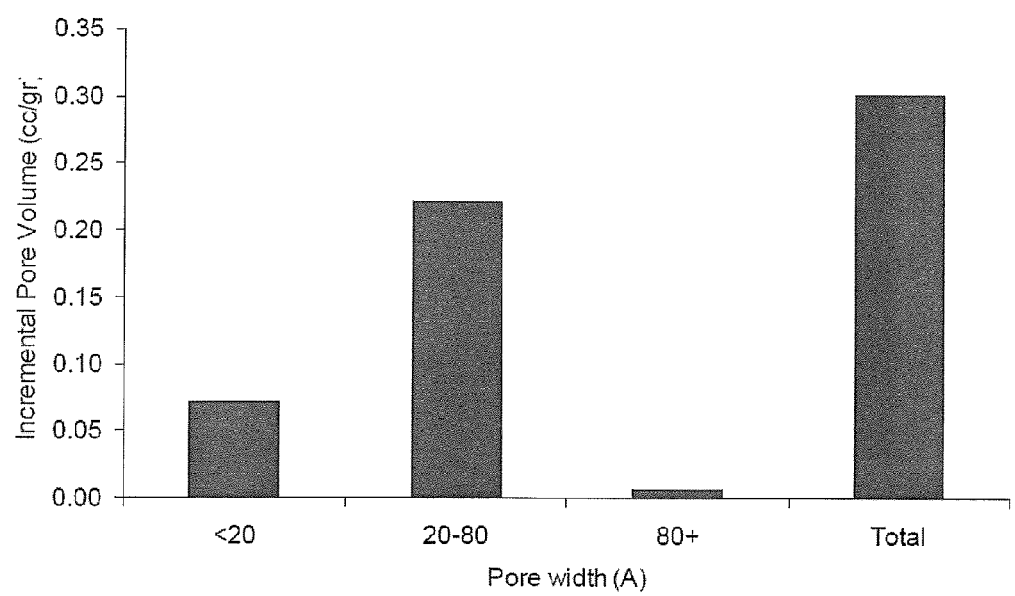
FIG. 7b is a pore size distribution plot obtained using non-linear density functional theory of the material produced in Example 7.

This treatment caused high reduction of zeolite microporosity, while introducing a significant amount of mesoporosity (FIGS. 7a and 7b).

Example 8

Acid Wash Pretreatment of CBV 500 with 1 Hour Drying at 80° C.

25 g of CBV 500 zeolite were added in 375 mL $H_2$ containing 9.5 g citric acid to form a suspension. The suspension was stirred for 30 min. at room temperature. The solid was vacuum filtered and washed using 375 mL $H_2O$. The filter cake was recovered and dried at 80° C. for 1 hr. Then the recovered pre-treated CBV 500 solid recovered from the filter cake was sieved.

15.38 g of the wet cake were added to a clear solution containing 102 mL $H_2O$, 31 mL $NH_4OH$, and 6.15 g CTAB to form a suspension. The suspension was treated in a sealed vessel at 80° C. for 24 hrs. After this time the solid was filtered out and washed with deionized water. The filter cake was recovered and dried in an oven overnight at 80° C. The sample was heated in nitrogen atmosphere at 550° C. for 2 hrs and then heated at 600° C. under air for 4 hrs.

Figure 8A:
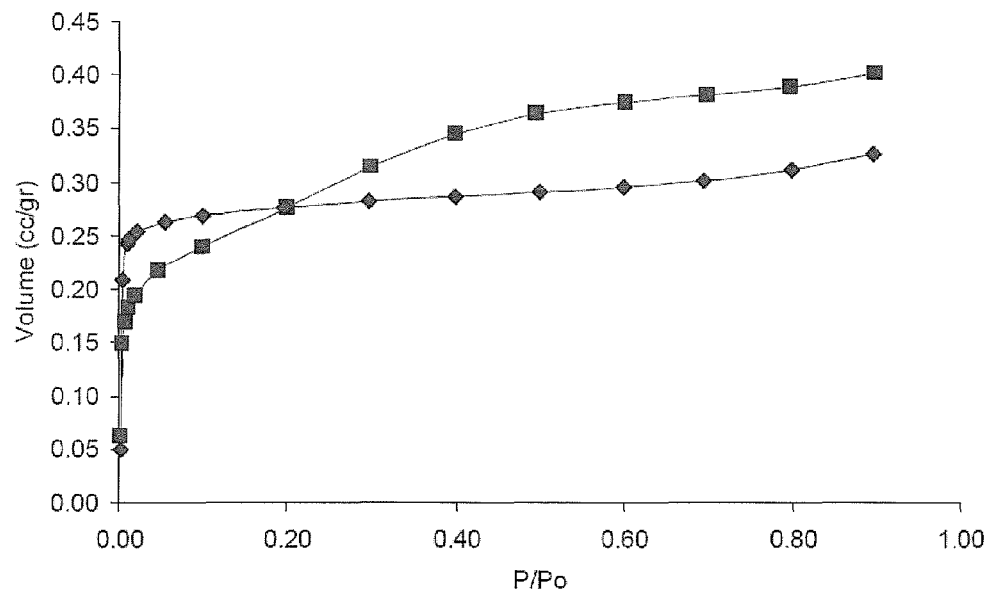
FIG. 8a is a graph depicting argon physisorption isotherms at 87K of CBV 500 before (diamond data points) and after (square data points) having been treated as described in Example 8.
Figure 8B:
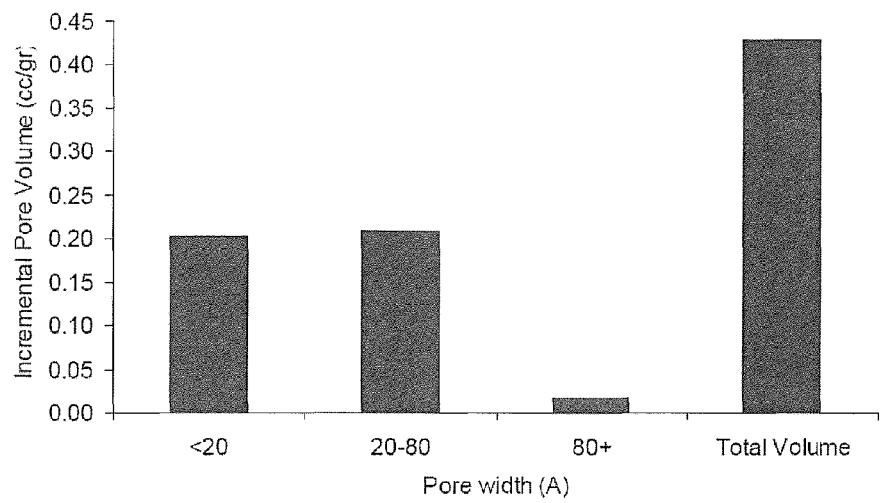
FIG. 8b is a pore size distribution plot obtained using non-linear density functional theory of the material produced in Example 8.

This treatment caused high retention of zeolite microporosity, while introducing a smaller amount of mesoporosity than in the case of Example 7 (FIGS. 8a and 8b).

Example 9

Acid Wash Pretreatment of CBV 500 with 24 Hour Drying at 80° C.

25 g of CBV 500 zeolite were added in 375 mL $H_2O$ containing 8 g citric acid to form a suspension. The suspension was stirred for 30 min. at room temperature. The solid was vacuum filtered and washed using 375 mL $H_2O$. The filter cake was recovered and dried in an oven at 80° C. for 24 hrs. Then the recovered pre-treated CBV 500 solid recovered from the filter cake was sieved.

21.86 g of the above solid were added to a clear solution containing 146 mL $H_2O$, 44 mL $NH_4OH$, and 8.74 g CTAB to form a suspension. The suspension was treated in a sealed vessel at 80° C. for 24 hrs. After this time the solid was filtered out and washed with deionized water. The filter cake was recovered and dried in an oven overnight at 80° C. The sample was heated in nitrogen atmosphere at 550° C. for 2 hrs and then heated at 600° C. under air for 4 hrs.

Figure 9A:
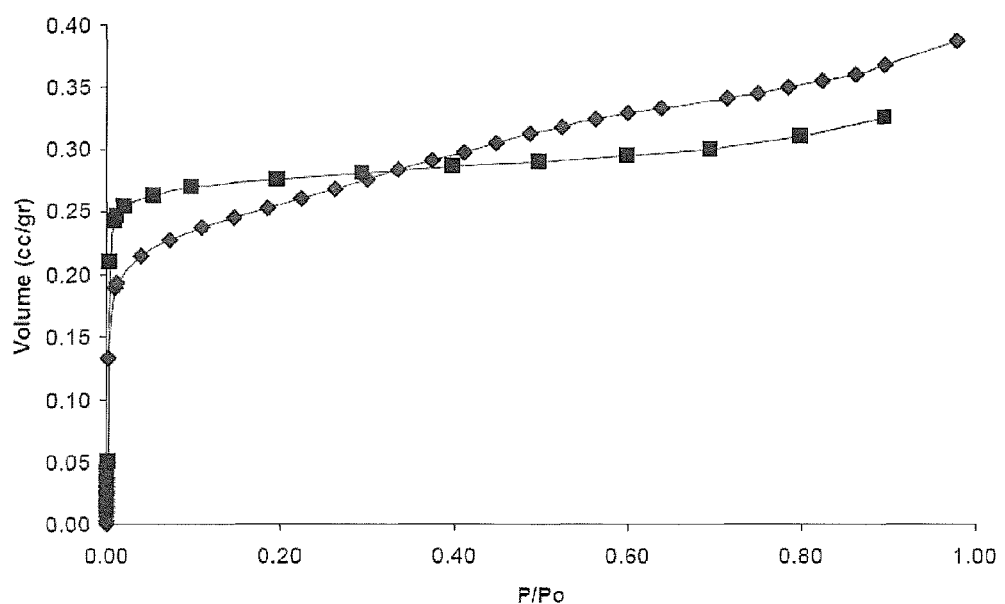
FIG. 9a is a graph depicting argon physisorption isotherms at 87K of CBV 500 before (square data points) and after (diamond data points) having been treated as described in Example 9.
Figure 9B:
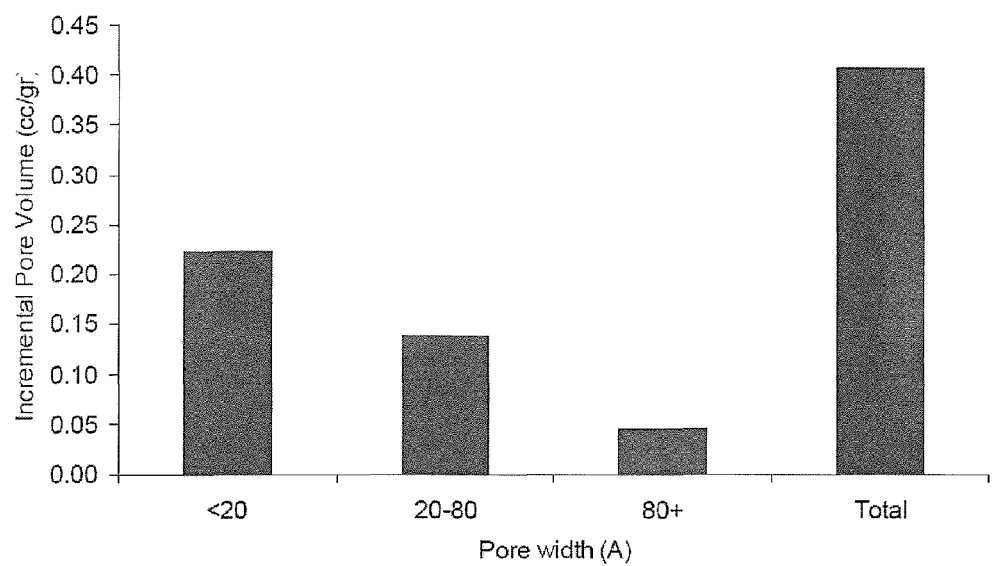
FIG. 9b is a pore size distribution plot obtained using non-linear density functional theory of the material produced in Example 9.

This treatment caused higher retention of zeolite microporosity, while introducing an even smaller amount of mesoporosity than it the case of Example 8 (FIGS. 9a and 9b).

Characterization Results for Examples 7-9

Argon adsorption was used in order to characterize the samples of Examples 7-9 in terms of their pore size distribution. Pore widths lower than 20 Å are considered to be microporosity, while pore widths from 20 to 80 Å are considered to be mesoporosity introduced by the technique herein described. In Table 2, the micro- and mesoporosity as well as the total pore volume of the three materials described in Examples 7-9 are given. For comparison, the micro- and mesoporosity of the original CBV 500 sample are shown. In Table 3, the crystallinity and the UCS of the materials described in Examples 7-9 are presented.

As shown in Table 2, as the severity of the drying conditions increases the amount of microporosity preserved. This is consistent with the theory of reduction in reactivity of the samples dried at higher temperatures. These conditions can be optimized. Very mild conditions (20° C., 1 h) causes the loss of most of the microporosity (from 0.32 to 0.072 cc/g), whereas more severe drying conditions (80° C., 24 h) causes a significant reduction in the mesoporosity introduced (0.222 to 0.110 cc/g), with improvement in the microporosity (0.224 compared to 0.072 cc/g).

TABLE 2

Micro-, Meso-, and Total Pore Volume for CBV 500 and Examples 7-9

| Sample | Drying conditions | Micropore Volume (cc/g) <20 Å | Mesopore Volume (cc/g) 20-80 Å | Total Pore Volume (cc/g) |
|---|---|---|---|---|
| CBV 500 | — | 0.320 | negligible | 0.320 |
| Example #7 | 20° C., 1 h | 0.072 | 0.222 | 0.301 |
| Example #8 | 80° C., 1 h | 0.202 | 0.209 | 0.428 |
| Example #9 | 80° C., 24 h | 0.224 | 0.110 | 0.351 |

TABLE 3

Crystallinity and Unit Cell Size for CBV 500 and Examples 7-9

| Sample | Drying conditions | UCS (Å) | Crystallinity, % |
|---|---|---|---|
| CBV 500 | — | 24.552 | 92.6 |
| Example #7 | 20° C., 1 h | — | — |
| Example #8 | 80° C., 1 h | 24.423 | 56.7 |
| Example #9 | 80° C., 24 h | 24.446 | 71.7 |

Example 10

Isomorphic Substitution Pretreatment of CBV 300

5 g of $NH_4Y$ zeolite (CBV 300 from Zeolyst International) were added to 250 mL of 3M ammonium acetate. To this mixture was added 24.5 mL of 0.4M ammonium hexafluorosilicate solution dropwise for 1 hour while stirring. The resulting solid was vacuum filtered and washed with $H_2O$.

21.86 g of the wet cake were added to a clear solution containing 146 mL $H_2O$, 44 mL $NH_4OH$, and 87.4 g CTAB to form a suspension. The suspension was treated in a sealed vessel at 80° C. for 24 hrs. After this time the solid was filtered out and washed with deionized water. The filter cake was recovered and dried in an oven overnight at 80° C. The sample was heated in nitrogen atmosphere at 550° C. for 2 hrs and then heated at 600° C. under air for 4 hrs.

Figure 10:
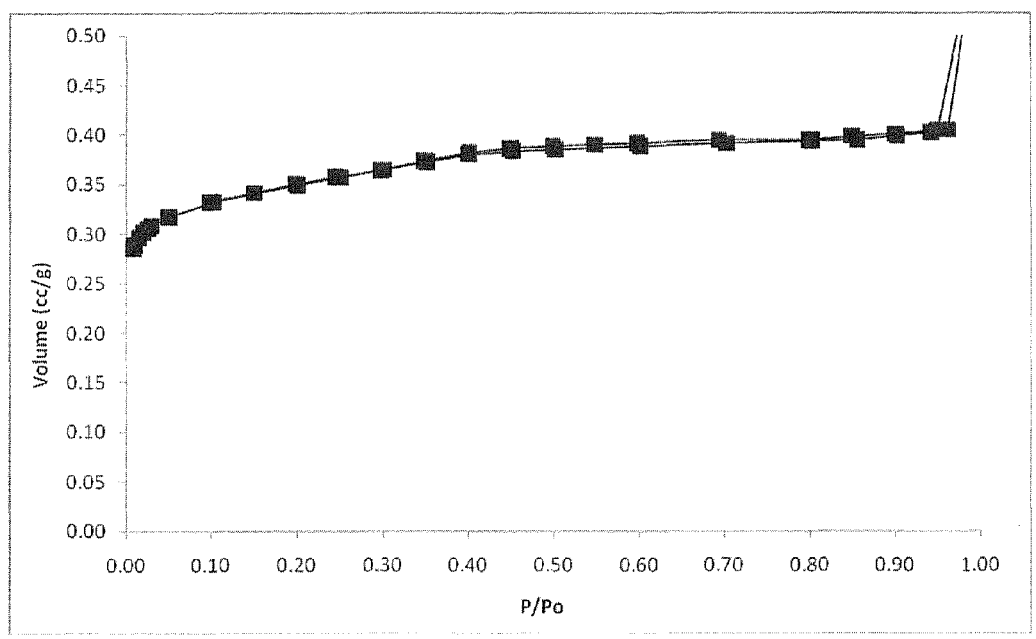
FIG. 10 is a graph depicting an argon physisorption isotherm at 77K of CBV 300 having been treated as described in Example 10.

FIG. 10 is a graph depicting an argon physisorption isotherm at 77K of the resulting mesostructured zeolite. As can be seen in FIG. 10, the mesostructured zeolite displays an increased mesopore volume beginning at approximately 0.3 relative pressure.

Figure 11A:
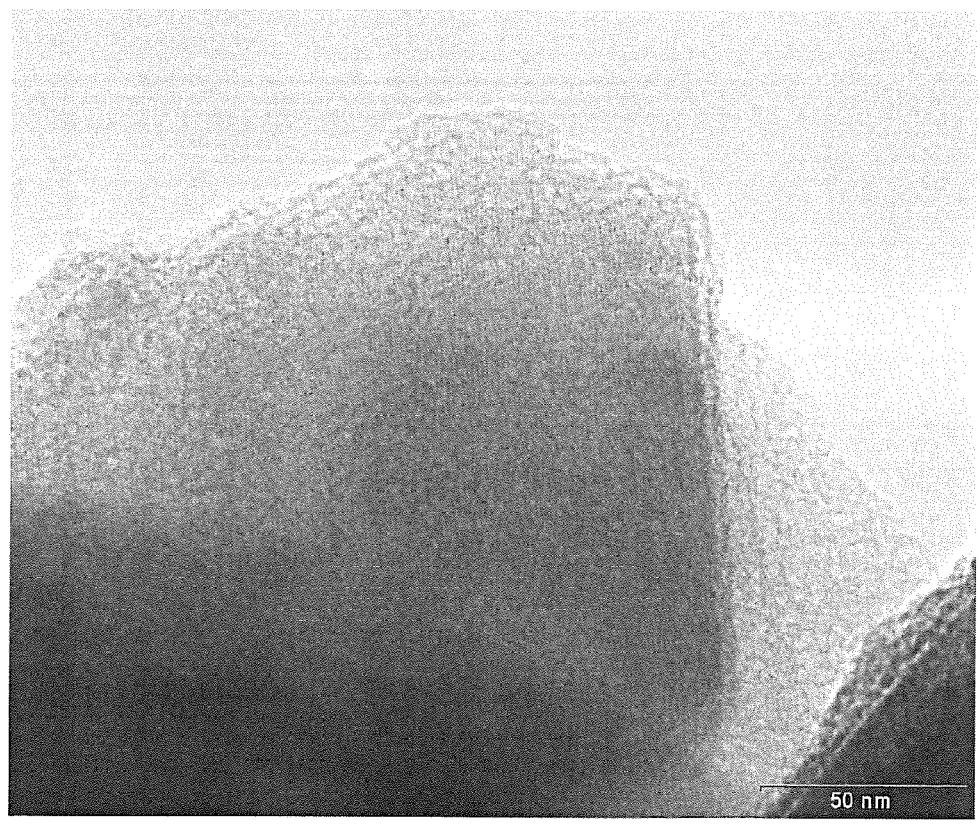
FIG. 11a is a TEM micrograph of the material prepared in Example 10.
Figure 11B:
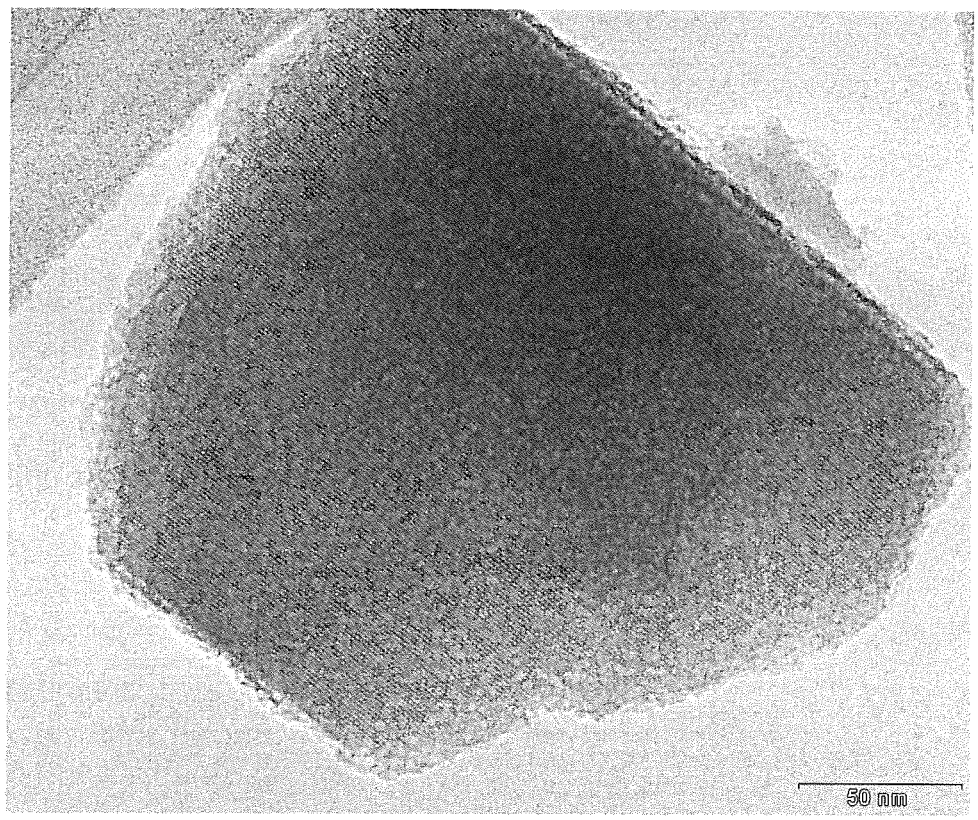
FIG. 11b is a TEM micrograph of the material prepared in Example 10.

FIGS. 11*a* and 11*b* are TEM micrographs of the material prepared in this Example.

SELECTED DEFINITIONS

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

Unless otherwise indicated, the term "mesoporous" is art-recognized and refers to a porous material comprising pores with an intermediate size, ranging anywhere from about 2 to about 50 nanometers.

The term "mesostructure" is art-recognized and refers to a structure comprising mesopores which control the architecture of the material at the mesoscopic or nanometer scale, including ordered and non-ordered mesostructured materials, as well as nanostructured materials, i.e., materials in which at least one of their dimensions is in the nanometer size range, such as nanotubes, nanorings, nanorods, nanowires, nanoslabs, and the like.

The term "mesostructured zeolites" as used herein includes all crystalline mesoporous materials, such as zeolites, aluminophosphates, gallophosphates, zincophosphates, titanophosphates, etc. Its mesostructure maybe in the form of ordered mesoporosity (as in, for example MCM-41, MCM-48 or SBA-15), non-ordered mesoporosity (as in mesocellular foams (MCF)), or mesoscale morphology (as in nanorods and nanotubes). The notation zeolite[mesostructure] is used to designate the different types of mesostructured zeolites.

"Y" represents a faujasite which is a zeolite comprising 2 moles of sodium and 1 mole of calcium in its octahedral crystal structure. This term also includes the acidic form of Y which may also be represented as "H—Y."

The term "zeolite" is defined as in the International Zeolite Association Constitution (Section 1.3) to include both natural and synthetic zeolites as well as molecular sieves and other microporous and mesoporous materials having related properties and/or structures. The term "zeolite" also refers to a group, or any member of a group, of structured aluminosilicate minerals comprising cations such as sodium and calcium or, less commonly, barium, beryllium, lithium, potassium, magnesium and strontium; characterized by the ratio (Al+Si):O=approximately 1:2, an open tetrahedral framework structure capable of ion exchange, and loosely held water molecules that allow reversible dehydration. The term "zeolite" also includes "zeolite-related materials" or "zeotypes" which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophophates, titanosilicates, etc.

What is claimed is:

1. A method of forming a material comprising at least one mesoporous zeolite, said method comprising the steps of:
   (a) acid washing a non-mesoporous initial zeolite with an acidic medium thereby forming an acid-washed zeolite, wherein said initial zeolite has a total silicon-to-aluminum ratio (Si/Al) of less than 30, wherein said initial zeolite has an extra-framework aluminum content from 25-100%, wherein said acid washing of step (a) removes aluminum atoms from said initial zeolite such that said acid-washed zeolite has a higher Si/Al ratio than said initial zeolite; and
   (b) subsequent to step (a), contacting said acid-washed zeolite with a mesopore-forming medium different than said acidic medium, thereby forming at least one mesopore within said acid washed zeolite and providing said mesoporous zeolite.

2. The method of claim 1, wherein said initial zeolite has an average unit cell size of at least 24.40 Å.

3. The method of claim 1, wherein said acid-washed zeolite has an average unit cell size of at least 24.30 Å.

4. The method of claim 1, wherein said initial zeolite is not steamed prior to said acid washing.

5. The method of claim 1, wherein said acid-washed zeolite has fewer Si—O—Al bonds in its zeolite framework than said initial zeolite.

6. The method of claim 1, wherein said acid-washed zeolite has a greater number of Si—OH and/or Al—OH terminal groups than said initial zeolite.

7. The method of claim 1, wherein said mesoporous zeolite is a one-phase hybrid single crystal having long range crystallinity.

8. The method of claim 1, wherein said mesoporous zeolite has a total 20 to 80 Å diameter mesopore volume of at least 0.05 cc/g.

9. The method of claim 1, wherein said mesoporous zeolite has a total 1 to 20 Å diameter micropore volume of less than 3.0 cc/g.

10. The method of claim 1, wherein said initial zeolite has a total 1 to 20 Å diameter micropore volume of at least 0.3 cc/g.

11. The method of claim 1, wherein said acid washing is performed at a temperature of not more than 100° C., wherein said acid washing is performed for a time period of not more than 12 hours, wherein said acidic medium has a pH in the range of from about 1 to about 6.

12. The method of claim 1, wherein said acidic medium comprises an acid selected from the group consisting of hydrochloric acid, hydrofluoric acid, sulfuric acid, nitric acid, acetic acid, sulfonic acid, oxalic acid, citric acid, EDTA, and mixtures of two or more thereof.

13. The method of claim 1, wherein said acidic medium comprises a chelating agent.

14. The method of claim 1, wherein said acidic medium comprises an acid that is present in an amount in the range of from about 1 to about 10 milliequivalents per gram of initial zeolite.

15. The method of claim 1, wherein said initial zeolite is a Y zeolite.

16. The method of claim 1, wherein said formation of at least one mesopore within said acid-washed zeolite is accomplished by contacting said acid-washed zeolite with at least one pH controlling medium and at least one surfactant thereby forming said mesoporous zeolite.

17. The method of claim 16, wherein said acid-washed zeolite is not dried prior to said contacting with said pH controlling medium and said surfactant.

18. The method of claim 1, wherein said acidic medium is in liquid form during said acid-washing.

19. The method of claim 1, wherein said forming of step (b) comprises contacting said acid-washed zeolite with a medium comprising at least one base.

20. The method of claim 19, wherein said medium further comprises at least one surfactant.

21. The method of claim 1, wherein said mesoporous zeolite comprises a mesostructured zeolite.

22. The method of claim 1, further comprising blending said mesoporous zeolite with a binder, a matrix, and/or an additive to thereby form a blended material.

23. The method of claim 22, further comprising shaping said blended material into a shaped material.

24. The method of claim 23, wherein said shaped material is a catalyst.

25. The method of claim 24, wherein said catalyst is a fluid catalytic cracking (FCC) catalyst.

26. A method of forming a material comprising at least one mesoporous zeolite, said method comprising the steps of:
   (a) acid washing a non-mesoporous initial zeolite with an acidic medium thereby forming an acid-washed zeolite, wherein said initial zeolite has an average unit size of at least 24.40 Å, wherein said initial zeolite has an extra-framework aluminum content from 25-100%, wherein said acid washing of step (a) removes aluminum atoms from said initial zeolite such that said acid-washed zeolite has a higher Si/Al ratio than said initial zeolite; and
   (b) subsequent to step (a), forming at least one mesopore within said acid washed zeolite and providing said mesoporous zeolite.

27. The method of claim 26, wherein said initial zeolite is not steamed prior to said acid washing.

28. The method of claim 26, wherein said acid-washed zeolite has fewer Si—O—Al bonds in its zeolite framework than said initial zeolite, wherein said acid-washed zeolite has a greater number of Si—OH and/or Al—OH terminal groups than said initial zeolite.

29. The method of claim 26, wherein said mesoporous zeolite is a one-phase hybrid single crystal having long range crystallinity, wherein said mesoporous zeolite has a total 20 to 80 Å diameter mesopore volume of at least 0.05 cc/g, wherein said mesoporous zeolite has a total 1 to 20 Å diameter micropore volume of less than 3.0 cc/g.

30. The method of claim 26, wherein said formation of at least one mesopore within said acid-washed zeolite is accomplished by contacting said acid-washed zeolite with at least one pH controlling medium and at least one surfactant thereby forming said mesoporous zeolite, wherein said acid-washed zeolite is not dried prior to said contacting with said pH controlling medium and said surfactant.

31. The method of claim 26, wherein said acidic medium is in liquid form during said acid-washing.

32. The method of claim 26, wherein said forming of step (b) comprises contacting said acid-washed zeolite with a medium comprising at least one base.

33. The method of claim 32, wherein said medium further comprises at least one surfactant.

34. The method of claim 26, wherein said mesoporous zeolite comprises a mesostructured zeolite.

35. The method of claim 26, wherein said acid washing of step (a) is performed at a temperature of not more than 100° C. and for a time period of not more than 12 hours.

36. A method of forming a material comprising at least one mesoporous zeolite, said method comprising the steps of:
(a) acid washing a non-mesoporous initial zeolite having a low silicon-to-aluminum ratio with an acidic medium thereby forming an acid-washed zeolite, wherein said acid washing is carried out at a temperature of not more than 100° C. and for a time period of not more than 12 hours, wherein said initial zeolite has an extra-framework aluminum content from 25-100%, wherein said acid washing of step (a) removes aluminum atoms from said initial zeolite such that said acid-washed zeolite has a higher Si/Al ratio than said initial zeolite; and
(b) subsequent to step (a), forming at least one mesopore within said acid-washed zeolite thereby forming said mesoporous zeolite, wherein said mesoporous zeolite has an increased mesoporosity and a decreased microporosity relative to said acid treated zeolite.

37. The method of claim 36, wherein said acid-washed zeolite has fewer Si—O—Al bonds in its zeolite framework than said initial zeolite, wherein said acid-washed zeolite has a greater number of Si—OH and/or Al—OH terminal groups than said initial zeolite.

38. The method of claim 36, wherein said acidic medium comprises an acid selected from the group consisting of hydrochloric acid, sulfuric acid, nitric acid, acetic acid, sulfonic acid, oxalic acid, citric acid, EDTA, and mixtures of two or more thereof.

39. The method of claim 36, wherein said acidic medium comprises a chelating agent.

40. The method of claim 36, wherein said initial zeolite is a Y zeolite.

41. The method of claim 36, wherein said mesoporous zeolite is a one-phase hybrid single crystal having long range crystallinity.

42. The method of claim 36, wherein said formation of at least one mesopore within said acid-washed zeolite is accomplished by contacting said acid-washed zeolite with at least one pH controlling medium and at least one surfactant thereby forming said mesoporous zeolite.

43. The method of claim 36, wherein said acidic medium is in liquid form during said acid washing.

44. The method of claim 36, wherein said forming of step (b) comprises contacting said acid-washed zeolite with a medium comprising at least one base.

45. The method of claim 44, wherein said medium further comprises at least one surfactant.

46. The method of claim 36, wherein said mesoporous zeolite comprises a mesostructured zeolite.

47. A method of forming a material comprising at least one mesoporous zeolite, said method comprising the steps of:
(a) contacting a non-mesoporous initial zeolite with an acidic medium at a temperature of not more than 100° C. and for a time period of not more than 12 hours to thereby form an acid-treated zeolite having reduced crystallinity relative to said initial zeolite, wherein said initial zeolite has an extra-framework aluminum content from 25-100%, wherein said acid washing of step (a) removes aluminum atoms from said initial zeolite such that said acid-treated zeolite has a higher Si/Al ratio than said initial zeolite; and
(b) subsequent to step (a), contacting said acid-treated zeolite with a basic medium to thereby form said mesoporous zeolite.

48. The method of claim 47, wherein said acidic medium has a pH in the range of 1 to 6.

49. The method of claim 47, wherein said basic medium has a pH in the range of 9 to 11.

50. The method of claim 47, wherein the total pore volume of said mesoporous zeolite is greater that the total pore volume of said acid-treated zeolite.

51. The method of claim 47, further comprising, prior to said contacting of step (b), drying said acid-treated zeolite at a drying temperature greater than 20° C. for a drying time greater than 1 hour.

52. The method of claim 51, wherein said drying time is less than 24 hours.

53. The method of claim 47, wherein said acidic medium comprises an acid selected from the group consisting of chlorhidric acid, sulphuric acid, nitric acid, acetic acid, sulfonic acid, oxalic acid, ethylenediaminetetraacetic acid (EDTA), and citric acid.

54. The method of claim 47, wherein said acidic medium comprises a chelating agent.

55. The method of claim 54, wherein said chelating agent is selected from the group consisting of oxalic acid, citric acid, and ethylenediaminetetraacetic acid (EDTA).

56. The method of claim 54, wherein said basic medium comprises said chelating agent.

57. The method of claim 47, wherein said basic medium comprises a pore forming agent.

58. The method of claim 57, wherein said pore forming agent comprises a surfactant.

59. The method of claim 47, further comprising realuminating said mesoporous zeolite to thereby lower the Si/Al ratio of said mesoporous zeolite.

60. The method of claim 47, wherein said material is a catalyst composition.

61. The method of claim 60, wherein said catalyst composition is a cracking catalyst.

62. The method of claim 61, wherein said cracking catalyst is a fluid catalytic cracking (FCC) catalyst.

63. The method of claim 60, wherein said catalyst composition further comprises a binder and a metal.

64. The method of claim 63, wherein said metal is a rare earth metal.

65. The method of claim 47, wherein said mesoporous zeolite is a mesostructured zeolite.

66. The method of claim 65, wherein said mesostructured zeolite comprises a one-phase hybrid single crystal having long-range crystallinity.

67. The method of claim 47, wherein said acid-treated zeolite is non-mesoporous.

68. The method of claim 47, wherein said initial zeolite has a total 20 to 80 Å diameter mesopore volume of less than 0.05 cc/g and said mesoporous zeolite has a total 20 to 80 Å diameter mesopore volume of at least 0.1 cc/g.

69. The method of claim 47, wherein said initial zeolite has a total 20 to 80 Å diameter mesopore volume of less than 0.01 cc/g and said mesoporous zeolite has a total 20 to 80 Å diameter mesopore volume of at least 0.2 cc/g.

70. The method of claim 47, wherein the total 1 to 20 Å diameter micropore volume of said mesoporous zeolite is less than the total 1 to 20 Å diameter micropore volume of said acid-treated zeolite.

71. The method of claim 47, wherein said acidic medium comprises an acid in an amount in the range of from about 1 to about 10 milliequivalents per grain of initial zeolite.

72. The method of claim 47, wherein said acid-treated zeolite has at least 1 percent fewer Si—O—Al bonds that said initial zeolite.

73. The method of claim 47, wherein said initial zeolite has an average unit cell size of at least 24.45 Å and said acid-treated zeolite has an average unit cell size of at least 24.35 Å.

74. The method of claim 47, further comprising, prior to said contacting of step (b), drying said acid-treated zeolite at a drying temperature in the range of 50 to 120° C. for a drying time in the range of 15 minutes to 2 hours.

75. The method of claim 74, wherein said drying temperature is in the range of 70 to 90° C. and said drying time is in the range of 30 minutes to 2 hours.

76. The method of claim 47, further comprising heat treating said mesoporous zeolite at a temperature in the range of 500 to 600° C. for a time in the range of 1 to 12 hours.

\* \* \* \* \*